(12) United States Patent
Fukuda (10) Patent No.: US 9,417,130 B2
(45) Date of Patent: Aug. 16, 2016

(54) INTERFERENCE SPECTROPHOTOMETER THAT CORRECTS LIGHT INTENSITY INFORMATION USING MIRROR VELOCITY INFORMATION

(71) Applicant: SHIMADZU CORPORATION, Kyoto-shi, Kyoto (JP)

(72) Inventor: Hisato Fukuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 361 days.

(21) Appl. No.: 14/148,911

(22) Filed: Jan. 7, 2014

(65) Prior Publication Data

US 2015/0192464 A1  Jul. 9, 2015

(51) Int. Cl.
*G01J 3/45* (2006.01)
*G01J 3/453* (2006.01)

(52) U.S. Cl.
CPC ..................... *G01J 3/4535* (2013.01)

(58) Field of Classification Search
CPC ............... G01J 2003/4538; G01J 3/453
See application file for complete search history.

(56) References Cited

U.S. PATENT DOCUMENTS

| | | | | |
|---|---|---|---|---|
| 4,655,587 A * | 4/1987 | Wijntjes | ............... | G01J 3/4535 318/640 |
| 7,889,349 B2 * | 2/2011 | Ridder | .................... | G01J 3/45 356/451 |
| 8,885,163 B2 * | 11/2014 | Morys | .................... | G01N 21/31 250/339.11 |

FOREIGN PATENT DOCUMENTS

| JP | 59-40133 | 3/1984 |
|---|---|---|
| JP | 07-19960 | 1/1995 |
| JP | 2002-148116 A | 5/2002 |
| JP | 2009-139352 A | 6/2009 |

OTHER PUBLICATIONS

Japanese Office Action issued Apr. 30, 2014 in Japanese Patent Application No. 2011-154694.
Japanese Advisory Action issued Nov. 4, 2014 in Japanese Patent Application No. 2011-154694.

* cited by examiner

*Primary Examiner* — Hwa Lee
(74) *Attorney, Agent, or Firm* — Sughrue Mion, PLLC (57) ABSTRACT

An interference spectrophotometer including a movable mirror unit having a movable mirror capable of reciprocating movement; a stationary mirror; an infrared light source unit which emits an infrared light; a beam splitter; an interference light detection unit which detects light intensity information of light transmitted or reflected by a sample; a movable mirror velocity information detection unit which detects movable mirror velocity information for movable mirror; and a control unit which acquires the light intensity information and movable mirror velocity information and computes the absorption or transmission spectrum of the sample; wherein the interference spectrophotometer further comprises a storage unit which stores a target movable mirror velocity range, and control unit does not employ light intensity information obtained when the movable mirror velocity of movable mirror was outside the target movable mirror velocity range for computing the absorption or transmission spectrum of the sample.

6 Claims, 8 Drawing Sheets

INTERFERENCE SPECTROPHOTOMETER THAT CORRECTS LIGHT INTENSITY INFORMATION USING MIRROR VELOCITY INFORMATION

The entire contents of Japan Patent Publication No. 2013-019833, published Jan. 31, 2013, are incorporated herein by reference.

TECHNICAL FIELD

The present invention relates to an interference spectrophotometer, especially a Fourier transform infrared spectrophotometer (hereinafter abbreviated as "FTIR").

BACKGROUND ART

A Michelson two-bean interferometer used for a FTIR has a configuration wherein infrared light emitted from an infrared light source is divided by a beam splitter 70 in two directions, toward a stationary mirror and a movable mirror, whereby the infrared light reflected back from the stationary mirror and the infrared light reflected back from the movable mirror are combined in the beam splitter and sent along a single optical path. Here, as the movable mirror is moved back and forth in the direction of the input light axis, the difference in optical path length of the two split light beams changes, and the combined light becomes an interference light signal (interferogram) whereof the light intensity changes according to the position of the movable mirror.

Figure 6:
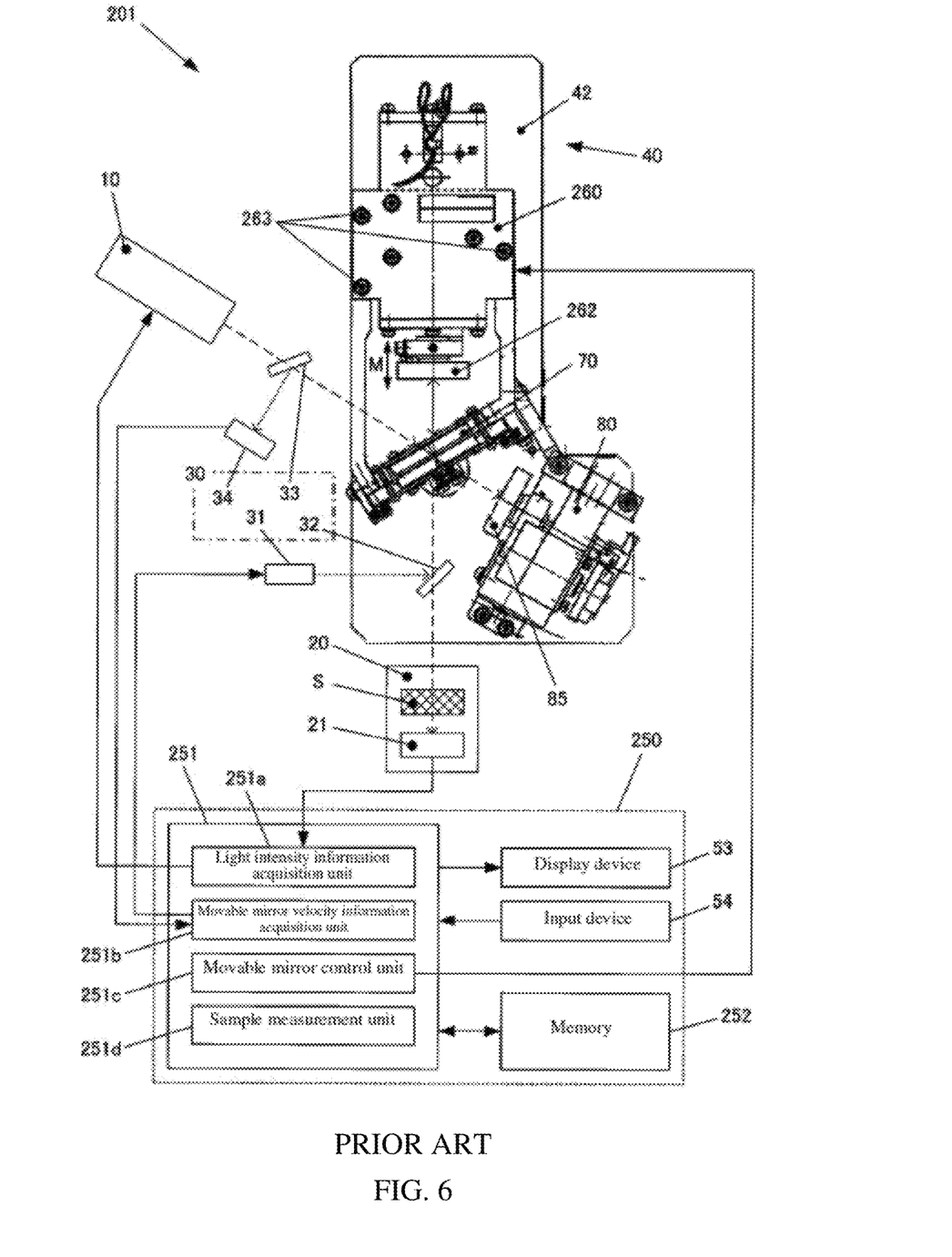
FIG. 6 A drawing showing the configuration of the main parts of a conventional FTIR.

FIG. 6 is a drawing which illustrates the configuration of the main parts of a conventional FTIR. FTIR 201 comprises a main interferometer principal part 40, an infrared light source unit 10 which emits infrared light, an infrared light detection unit 20 in which sample S is placed, a movable mirror velocity information detection unit 30, and a computer 250 (for example, see Patent Literature 1).

Infrared light source unit 10 comprises an infrared light source which emits infrared light, a converging mirror, and a collimator mirror. By means of this, the infrared light which is emitted from the infrared light source is outputted via the converging mirror and collimator mirror to beam splitter 70 of main interferometer principal part 40.

Infrared light detection unit 20 comprises a parabolic mirror, an ellipsoidal mirror, an infrared detector 21 which detects an interferogram (IFG signal), and a sample placement unit in which a sample S is placed. By means of this, the light converged by the parabolic mirror is shined on the sample S, and light which passes through (or is reflected by) the sample S is converged by the ellipsoidal mirror toward the infrared detector 21.

The main interferometer principal part 40 comprises a case 42 with an inside space, a movable mirror unit 260 is arranged in the top part of FIG. 6, a beam splitter 70 is arranged in the middle part of FIG. 6, and a stationary mirror unit 80 comprising a stationary mirror 85 is arranged in the lower part of FIG. 6.

Figure 7:
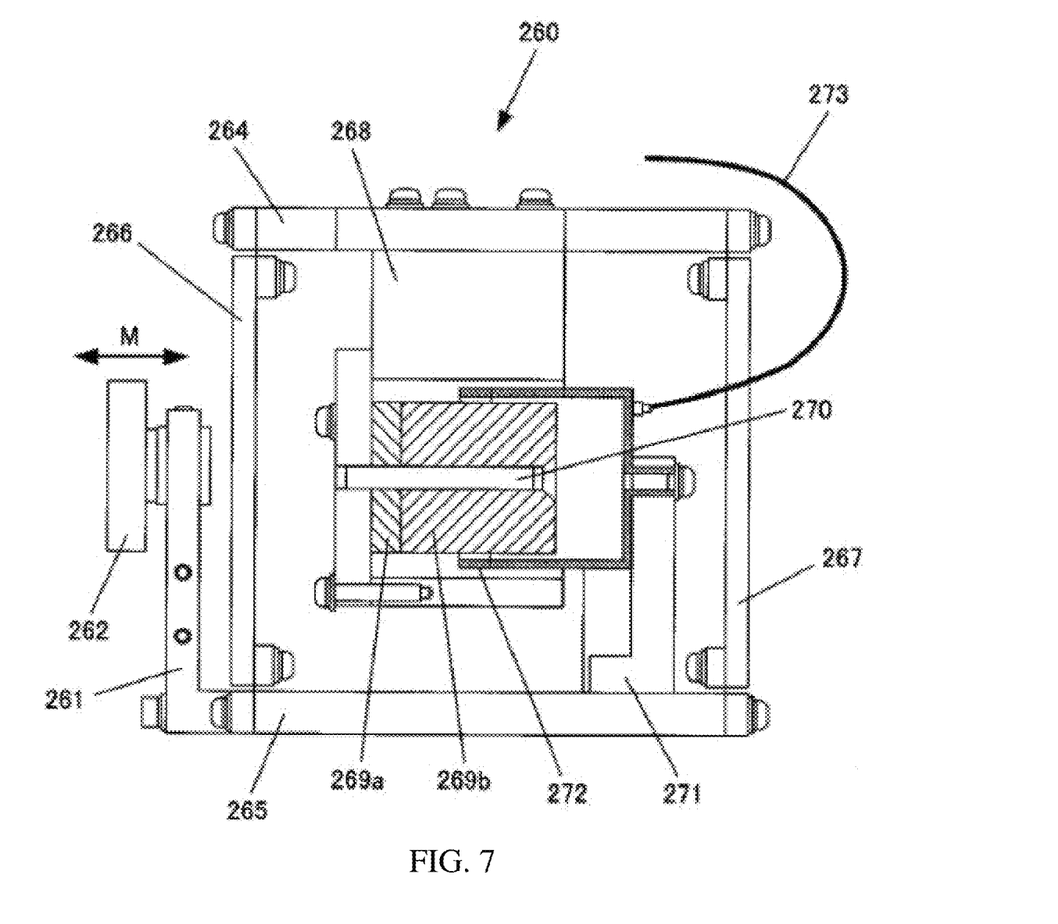
FIG. 7 A vertical cross-sectional view of a movable mirror unit.

FIG. 7 is a vertical cross-sectional view of mobile mirror unit 260. The mobile mirror unit 260 comprises a ceiling plate 264, a bottom plate 265 and two plates 266, 267. The top end part of plate 266 is coupled to the left side part of the bottom surface of ceiling plate 264, and the bottom end part of plate 266 is coupled to the left side part of the top surface of bottom plate 265. Furthermore, the top end part of plate 267 is coupled to the right side part of the bottom surface of ceiling plate 264 and the bottom end part of plate 267 is coupled to the right side part of the top surface of bottom plate 265.

As a result, the bottom plate 265 is suspended by means of plates 266 and 267 so as to be movable in the left-right direction with respect to the ceiling plate 264.

A yoke 268 is secured to the middle part of the bottom surface of the ceiling plate 264, and a magnet 269a and pole piece 269b are secured to the yoke 268 by a bolt 270.

A voice coil 272 is secured via angle plate 271 to the central part of the top surface of the bottom plate 265. A lead wire 273 is electrically connected to the voice coil 272, and the voice coil 272 is designed to move through the magnetic field formed by magnet 269a, yoke 268 and pole piece 269b.

A mirror holder 261 is secured to the left side of the top surface of the bottom plate 265, and the central part of disc-shaped movable mirror 262 is secured to the top end part of mirror holder 261. As a result, when electric current is made to flow via lead wire 273 to voice coil 272, the voice coil 272 receives magnetic force due to the magnetic field formed between yoke 268 and pole piece 269b, and when the bottom plate 265 moves in the left-ride direction, the movable mirror 262 also moves in the left-right direction M.

Furthermore, the ceiling plate 264 of the movable mirror unit 260 is attached to the case 42 using a screw and washer 263.

Figure 8:
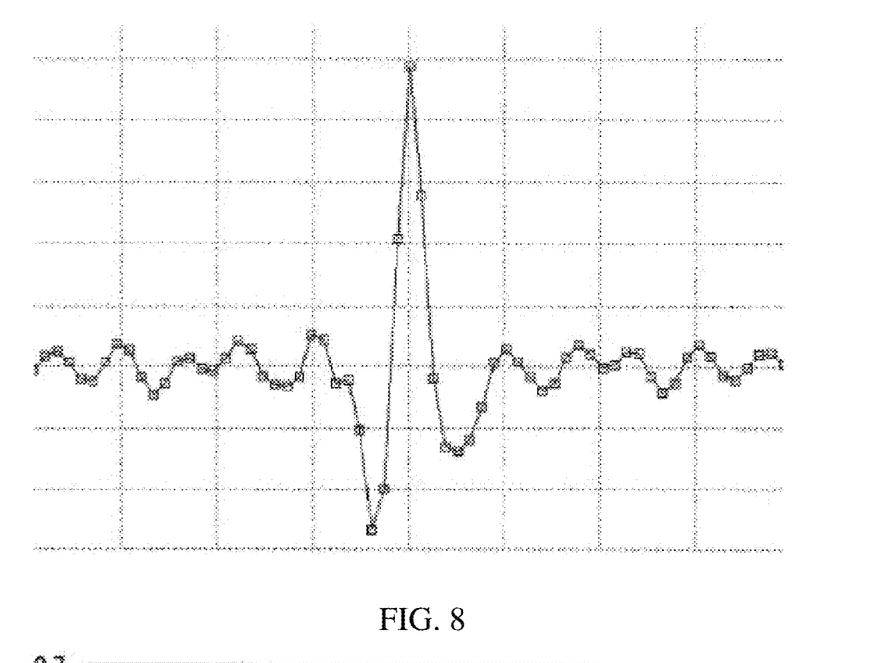
FIG. 8 A drawing showing an IFG signal illustrating an example of the relationship between light intensity and movable mirror position.

With a main interferometer principal part 40 of this sort, the infrared light emitted from infrared light source unit 10 is shined onto beam splitter 70, and is split by the beam splitter 70 in two directions, toward the stationary mirror 85 and movable mirror 262. The infrared light reflected back from the stationary mirror 85 and the infrared light reflected back from the movable mirror 262 return to the beam splitter 70, and are combined by the beam splitter 70 and sent along an optical path toward infrared light detection unit 20. Here, the movable mirror 262 moves back and forth in reciprocating fashion in the input light axis direction M, so the difference in optical path length of the two split beams changes periodically, and the light which heads from the beam splitter 70 to the infrared light detection unit 20 becomes an interferogram whereof the amplitude varies over time. Furthermore, the interferogram which has passed through sample S is converged toward infrared detector 21. FIG. 8 is a drawing which shows an IFG signal illustrating an example of the relationship between light intensity and movable mirror position.

Furthermore, a movable mirror velocity information detection unit 30 which detects movable mirror velocity information is provided in FTIR 201. The movable mirror velocity information detection unit 30 performs velocity information detection using laser light, and comprises a He—Ne laser light source unit 31 which emits laser light, half-mirrors 32 and 33 which reflect laser light, and laser light detection unit 34 which detects laser light information (for example, see Patent Literature 2).

With this sort of movable mirror velocity information detection unit 30, the laser light emitted from the He—Ne laser light source unit 31 is shined onto beam splitter 70, and is divided by the beam splitter 70 in two directions, toward stationary mirror 85 and movable mirror 262. Furthermore, the laser light reflected back from the stationary mirror 85 and the laser light reflected back from the movable mirror 262 return to the beam splitter 70 and are combined in the beam splitter 70 and sent along an optical path toward laser light detection unit 34. Here as well, since the movable mirror 262 moves back and forth in reciprocating fashion in the input light axis direction M, the difference in optical path length of the two divided beams changes periodically, and the light which heads from the beam splitter 70 to the laser light detection unit 34 becomes laser interference light whereof the amplitude changes over time. Furthermore, the laser interference light is introduced into laser light detection unit 34. The detection signal, i.e. laser light interference stripe signal produced by this laser light detector is used to compute the location of the movable mirror 262, the movable mirror velocity Vc, etc.

Computer 250 comprises a CPU (control unit) 251 and memory 252, and is connected to a display device 53 and input device 54. To describe the functions processed by the CPU 251 in terms of blocks, the CPU has a light intensity information acquisition unit 251a which acquires light intensity information from infrared detector 21; a movable mirror velocity information acquisition unit 251b which acquires movable mirror velocity information (movable mirror velocity Vc, etc.) from laser light detection unit 34; a movable mirror control unit 251c which controls the movable mirror velocity Vc in the movable mirror unit 260; and a sample measurement unit 251d which computes the absorption spectrum of the sample S.

In cases where a DLATGS detector is used as the infrared detector 21, the DLATGS detector 21 has a frequency characteristic. Thus, if the movable mirror velocity Vc of the movable mirror 262 is not constant, the frequency of flickering of the interferogram becomes non-constant, which appears as measurement error in the absorption spectrum of the sample S. Specifically, if the movable mirror velocity Vc of the movable mirror 262 at the time of background measurement and the movable mirror velocity Vc of the movable mirror 262 at the time of measurement of the sample S differ, there will be baseline distortion of the absorption spectrum and worsening of S/N. Furthermore, during background measurement and measurement of the sample S, accumulation of the IFG signal is performed as the movable mirror 262 repeats its reciprocating movement, and if the movable mirror velocity Vc of the movable mirror 262 changes during accumulation of the IFG signal, there will be a worsening of S/N.

Figure 9:
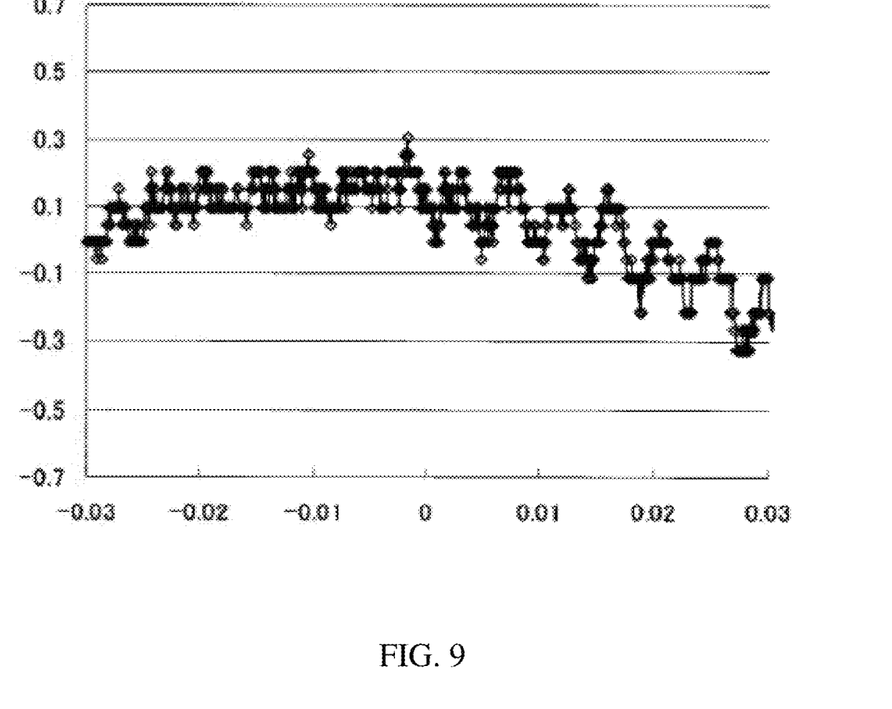
FIG. 9 A drawing showing a velocity error signal illustrating an example of the relationship between velocity error and movable mirror position.

Thus, to make the movable mirror velocity Vc of the movable mirror 262 constant, the movable mirror control unit 251c determines the velocity error $(100\times(Vc-Vo)/Vo)$ between the current movable mirror velocity Vc and the target movable mirror velocity Vo and performs feedback control of the voltage applied to the movable mirror unit 260 (the movable mirror application voltage). As a result, the movable mirror velocity Vc is adjusted to the target movable mirror velocity Vo (constant). It will be noted that the "target movable mirror velocity Vo" is stored in memory 252 by the measurer using input device 54. FIG. 9 is a drawing which shows a velocity error signal illustrating an example of the relationship between velocity error and movable mirror position.

PRIOR ART LITERATURES (Patent literature 1) Japanese Unexamined Patent Application Publication 2002-148116
(Patent literature 2) Japanese Unexamined Patent Application Publication 2009-139352

SUMMARY OF THE INVENTION

However, while an FTIR 201 as described above performs feedback control, the movable mirror velocity Vc may fluctuate due to external interference (vibration, noise). While the FTIR 201 is designed with a quake-resistant structure, it is not possible to prevent external interference completely. Consequently, with an FTIR 201 as described above, when external interference occurs, it is not possible to accurately compute the absorption spectrum of the sample S.

It is therefore the purpose of the present invention to provide an interference spectrophotometer which can accurately compute the absorption or transmission spectrum of a sample even when external interference occurs and the movable mirror velocity Vc is not constant.

The interference spectrophotometer of the present invention, made to resolve the aforementioned problem, is an interference spectrophotometer comprising a movable mirror unit having a movable mirror capable of reciprocating movement; a stationary mirror; an infrared light source unit which emits an infrared light; a beam splitter which receives infrared light from said infrared light source unit, splits it into two toward said fixed mirror and movable mirror, receives the infrared light which is reflected back from said stationary mirror and the infrared light which is reflected back from the movable mirror, and combines them into interference light; an interference light detection unit in which a sample is placed and which detects light intensity information of interference light transmitted or reflected by said sample; a movable mirror velocity information detection unit which detects movable mirror velocity information for said movable mirror; and a control unit which acquires said light intensity information and movable mirror velocity information and computes the absorption or transmission spectrum of said sample; wherein the interference spectrophotometer further comprises a storage unit which stores a target movable mirror velocity range, and said control unit does not employ light intensity information obtained when the movable mirror velocity of said movable mirror was outside the target movable mirror velocity range for computing the absorption or transmission spectrum of said sample.

With the interference spectrophotometer of the present invention, as described above, light intensity information obtained when the movable mirror velocity of the movable mirror is outside the target movable mirror velocity range is not used for computing the absorption or transmission spectrum of the sample, making it possible to accurately compute the absorption or transmission spectrum of the sample.

Furthermore, the interference spectrophotometer of the present invention, made to resolve the aforementioned problem, is an interference spectrophotometer comprising a movable mirror unit having a movable mirror capable of reciprocating movement; a stationary mirror; an infrared light source unit which emits an infrared light; a beam splitter which receives infrared light from said infrared light source unit, splits it into two toward said fixed mirror and movable mirror, receives the infrared light which is reflected back from said stationary mirror and the infrared light which is reflected back from the movable mirror, and combines them into interference light; an interference light detection unit in which a sample is placed and which detects light intensity information of interference light transmitted or reflected by said sample; a movable mirror velocity information detection unit which detects movable mirror velocity information for said movable mirror; and a control unit which acquires said light intensity information and movable mirror velocity information and computes the absorption or transmission spectrum of said sample; wherein the interference spectrophotometer further comprises a storage unit which stores a correlation function indicating change in light intensity information in relation to movable mirror velocity, and a target movable mirror velocity, and said control unit corrects the light intensity information obtained by said interference light detection unit into corrected light intensity information which would be obtained when the movable mirror velocity of said movable mirror is the target movable mirror velocity, using said movable mirror velocity information and correlation function.

With the interference spectrophotometer of the present invention, as described above, light intensity information obtained by the interference light detection unit is corrected into corrected light intensity information which would be obtained when the movable mirror velocity of the movable mirror is the target movable mirror velocity, using movable mirror velocity information and a correlation function, thus making it possible to accurately compute the absorption or transmission spectrum of the sample. Furthermore, since correction is performed, there is no data which is discarded and the process does not become prolonged.

Furthermore, in the above invention, said movable mirror velocity information detection unit comprises a laser light source which emits a laser light, and a laser light detection unit which, after said laser light has been split in two by a beam splitter toward said stationary mirror and movable mirror, detects the laser light which is reflected back from said stationary mirror and the laser light which is reflected back from the movable mirror; and said control unit computes the movement direction of said movable mirror, the location of said movable mirror and the movable mirror velocity based on said laser interference light.

Furthermore, the above invention may be made such that said control unit generates an interference light signal indicating the relationship between said light intensity information and movable mirror position based on said light intensity information, the movement direction of said movable mirror, the position of said movable mirror and the movable mirror velocity, and accumulates said interference light signal as said movable mirror repeats its reciprocating movement.

Moreover, the above invention may be made such that said control unit performs feedback control of the voltage provided to said movable mirror unit so as to adjust said movable mirror velocity to the target movable mirror velocity.

DETAILED DESCRIPTION OF THE EXEMPLARY EMBODIMENTS

Modes of embodiment of the present invention will be described below using the drawings. It will be noted that the present invention is not limited to the modes of embodiment described below, and includes various other modes that do not deviate from the gist of the present invention.

First Mode of Embodiment

Figure 1:
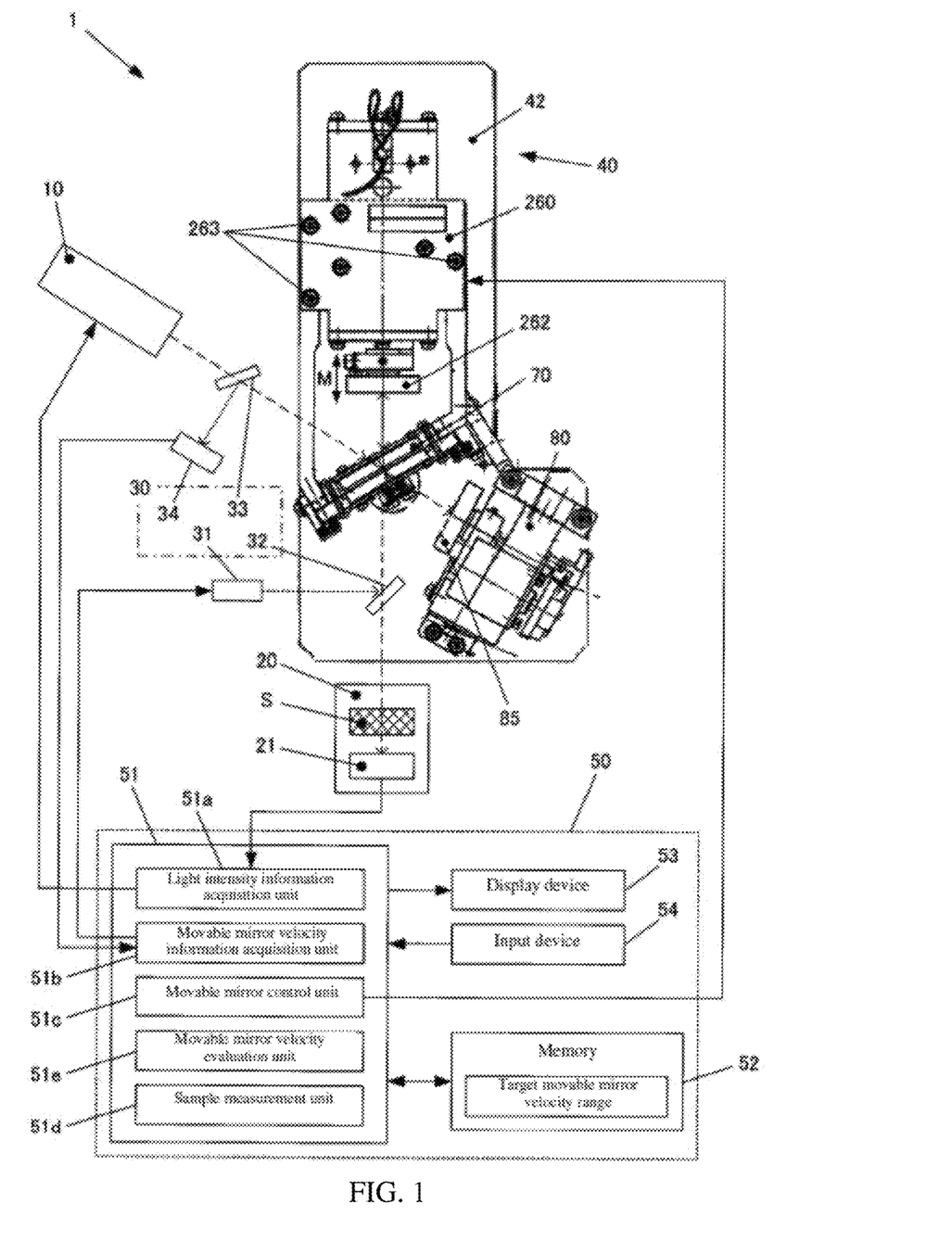
FIG. 1 A drawing showing the configuration of the main parts of an FTIR pertaining to a first mode of embodiment of the present invention.

FIG. 1 is a drawing which shows the configuration of the main parts of an FTIR pertaining to a first mode of embodiment of the present invention. Parts which are the same as in FTIR 201 have been assigned the same reference symbols.

FTIR 1 comprises a main interferometer principal part 40, an infrared light source unit 10 which emits infrared light, an infrared light detection unit 20 in which a sample S is placed, a movable mirror velocity information detection unit 30, and a computer 50.

Computer 50 comprises a CPU (control unit) 51 and a memory 52, and is connected to a display device 53 and input device 54. To describe the functions processed by the CPU 51 in terms of blocks, the CPU has a light intensity information acquisition unit 51a which acquires light intensity information from infrared detector 21; a movable mirror velocity information acquisition unit 51b which acquires movable mirror velocity information (movable mirror velocity Vc, etc.) from laser light detection unit 34; a movable mirror control unit 51c which controls the movable mirror velocity Vc in the movable mirror unit 260; a sample measurement unit 51d which computes the absorption spectrum of the sample S; and a movable mirror velocity evaluation unit 51e.

Furthermore, a target movable mirror velocity range (Vo±A) for preventing the use of inappropriate IFG signals is stored in advance in the memory 52. A is an arbitrary constant. Furthermore, a "target movable mirror velocity Vo" can be stored in the memory 52 by the measurer using the input device 54.

The movable mirror velocity evaluation unit 51e performs control so as to prevent the use of IFG signals containing light intensity information obtained when the maximum value of the absolute value of movable mirror velocity Vc was outside the target movable mirror velocity range (Vo+A), for computation of the absorption spectrum of the sample S.

Figure 2:
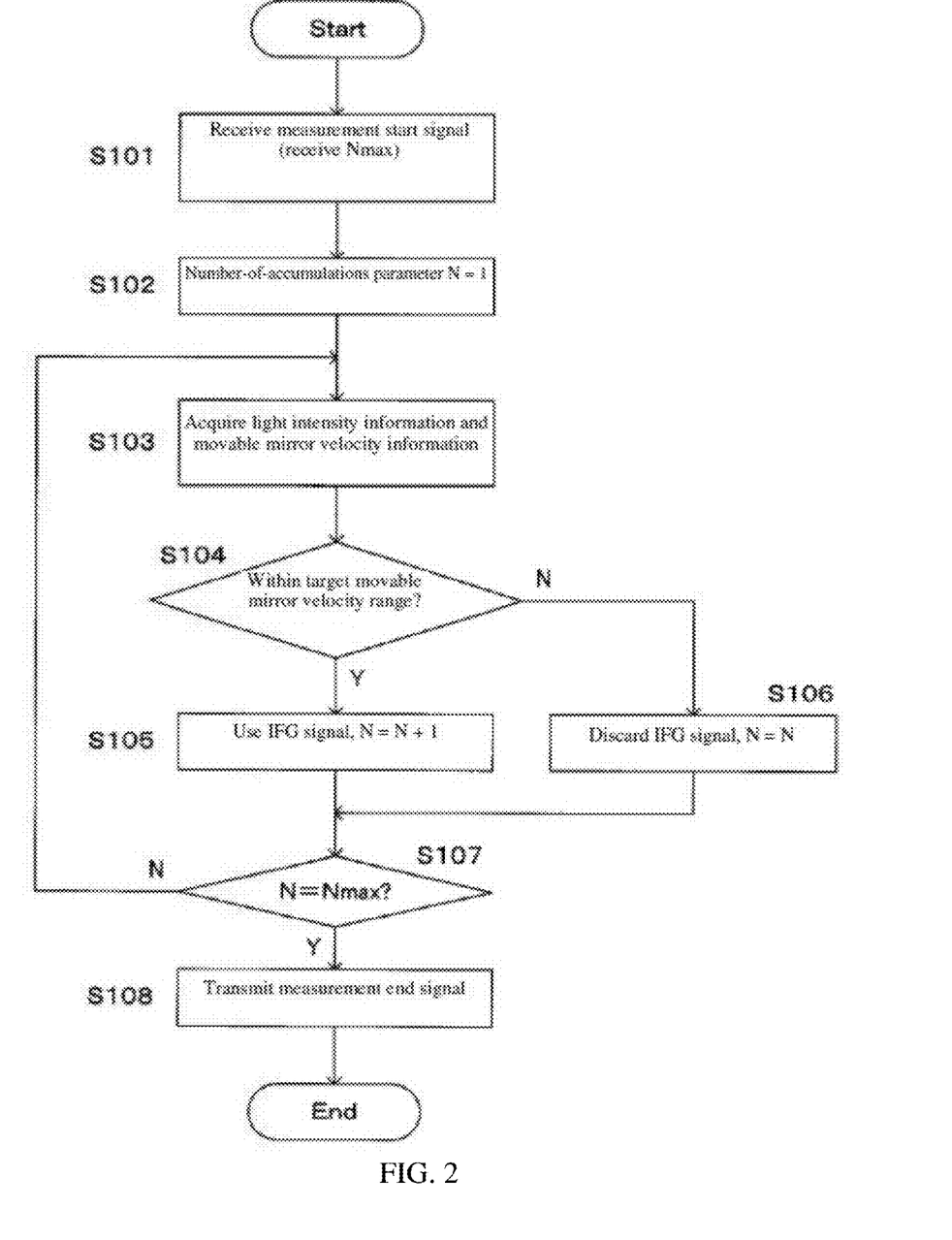
FIG. 2 A flow chart illustrating a method of acquiring IFG signal data.

Here, the acquisition method will be described for acquiring IFG signal data for IFG signals with a number of accumulations Nmax. FIG. 2 is flow chart intended to explain the method of acquiring IFG signal data.

First, in the processing of step S101, the measurer inputs a measurement start signal using the input device 54. At this time, the measurer inputs the "number of accumulations Nmax" and "target movable mirror velocity Vo" and stores them in memory 52.

Next, in the processing of step S102, the number-of-accumulations parameter N is set to 1.

Next, in the processing of step S103, as the movable mirror control unit 51c moves the movable mirror 262, the light intensity information acquisition unit 51a acquires light intensity information, and the movable mirror velocity information acquisition unit 51b acquires movable mirror velocity information (movable mirror velocity Vc, etc.). The Nth IFG signal representing the relationship between light intensity and movable mirror position is then generated (see FIG. 8).

Next, in the processing of step S104, it is determined if the maximum value of the absolute value of the movable mirror velocity Vc in the Nth IFG signal is within the target movable mirror velocity range (Vo+A). If it is determined that the maximum value of the absolute value of movable mirror velocity Vc is within the target movable mirror velocity range (Vo+A), then the Nth IFG signal is used for computing the absorption spectrum of the sample S in the processing of step S105. Furthermore, N is made equal to N+1.

On the other hand, if it is determined in the processing of step S104 that the maximum value of the absolute value of the movable mirror velocity Vc in the Nth IFG signal is not within the target movable mirror velocity range (Vo+A), then the Nth IFG signal is not used for computing the absorption spectrum of the sample S in the processing of step S106. In this case, the Nth IFG signal is discarded, so N is made equal to N.

Next, in the processing of step S107, it is determined if N is equal to Nmax. If it is determined that N is not equal to Nmax, the flow returns to step S103. Namely, the processing of step 103 through step S107 is repeated until the number of IFG signals that will be used for computing the absorption spectrum of the sample S reaches Nmax.

Furthermore, if it is determined that N=Nmax, then in the processing of step S108, since Nmax suitable IFG signals have been acquired, a measurement end signal is outputted.

As described above, with FTIR 1, IFG signals containing light intensity information obtained when the maximum value of the absolute value of the movable mirror velocity Vc of the movable mirror 262 was outside the target movable mirror velocity range (Vo+A) are not used for computing the absorption spectrum of the sample S, thus making it possible to accurately compute the absorption spectrum of the sample S.

Second Mode of Embodiment

Figure 3:
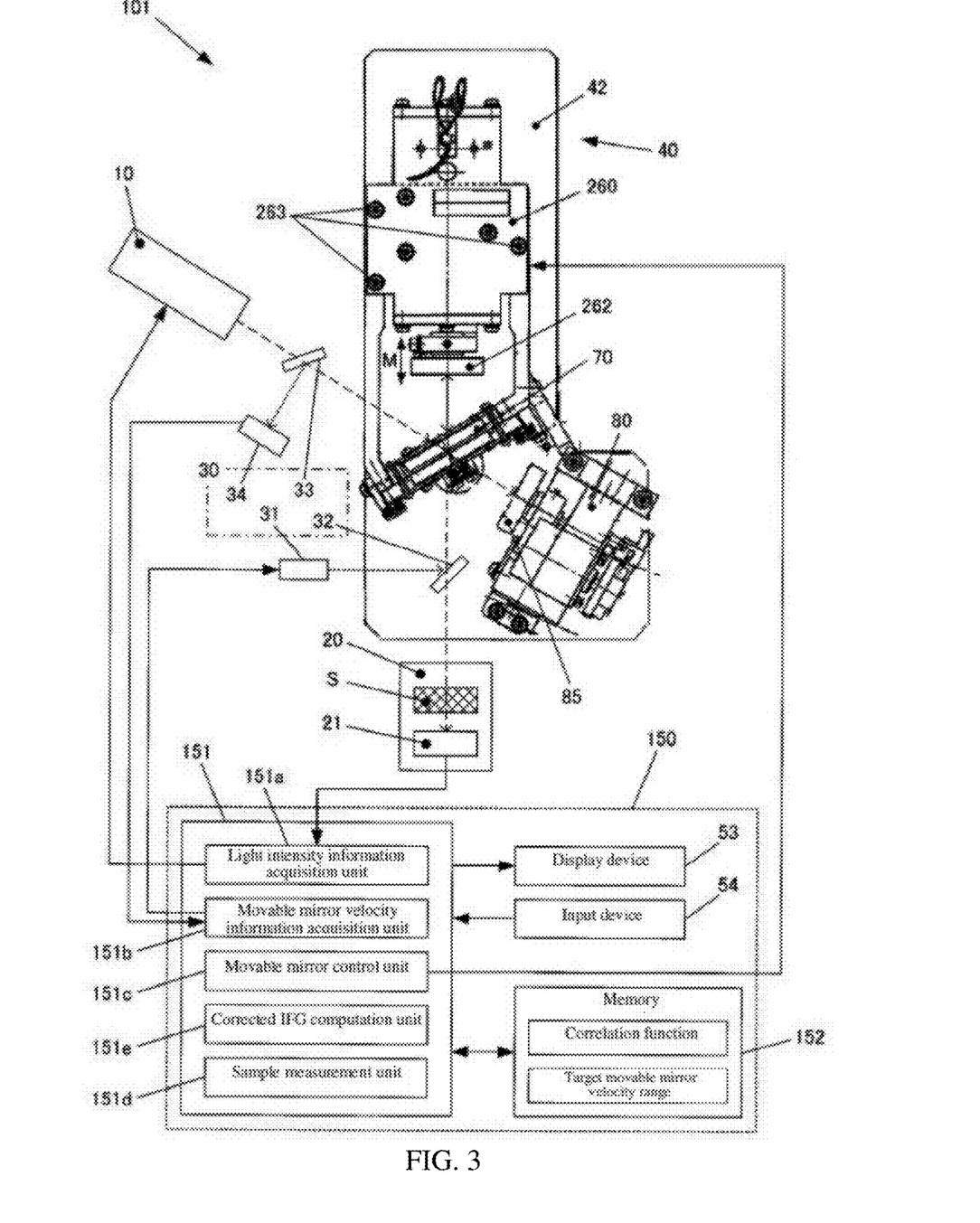
FIG. 3 A drawing showing the configuration of the main parts of an FTIR pertaining to a second mode of embodiment.

FIG. 3 is a drawing showing the configuration of the main parts of an FTIR pertaining to a second mode of embodiment. Parts which are the same as those of FTIR 201 have been assigned the same reference symbols.

FTIR 101 comprises a main interferometer principal part 40, an infrared light source unit 10 which emits infrared light, an infrared light detection unit 20 in which a sample S is placed, a movable mirror velocity information detection unit 30, and a computer 150.

Computer 150 comprises a CPU (control unit) 151 and a memory 152, and is connected to a display device 53 and input device 54. To describe the functions processed by the CPU 151 in terms of blocks, the CPU has a light intensity information acquisition unit 151a which acquires light intensity information from infrared detector 21; a movable mirror velocity information acquisition unit 151b which acquires movable mirror velocity information (movable mirror velocity Vc, etc.) from laser light detection unit 34; a movable mirror control unit 151c which controls the movable mirror velocity Vc in the movable mirror unit 260; a sample measurement unit 151d which computes the absorption spectrum of the sample S; and a corrected IFG signal generating unit 151e.

Figure 4:
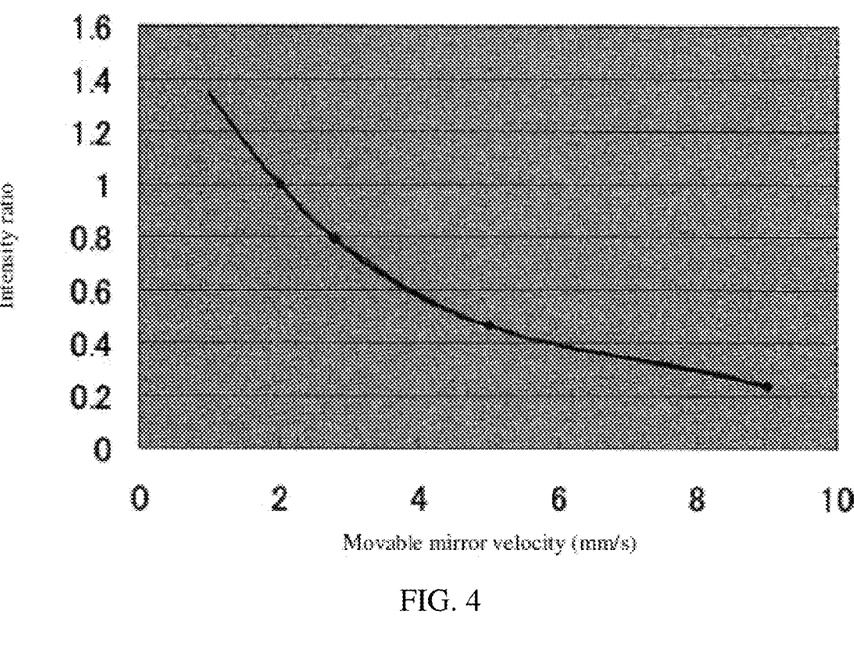
FIG. 4 A drawing showing an example of a correlation function representing change in light intensity information in relation to movable mirror velocity.

Furthermore, a correlation function indicating the change in light intensity information relative to movable mirror velocity for converting an IFG signal into a corrected IFG signal, and a target movable mirror velocity range (Vo±B) for preventing the use of unsuitable light intensity information, are stored in advance in memory 152. B is an arbitrary constant. FIG. 4 is a drawing which shows an example of a correlation function representing change in light intensity information in relation to movable mirror velocity. Here, the conversion method for converting an IFG signal to a corrected IFG signal will be described. For example, given a target movable mirror velocity Vo of 2.0 mm/s and a target movable mirror velocity range of (Vo±0.4 mm/s), assume that the movable mirror velocity Vc at some one point in the IFG signal become 2.5 mm/s due to external interference or the like. As shown in FIG. 4, the light intensity information obtained in the case of 2.5 mm/s is 0.86-fold the light intensity information obtained in the case of 2.0 mm/s. Thus, for this one point, the light intensity information is divided by 0.86. As a result, the light intensity information obtained when the velocity was 2.5 mm/s is adjusted to the light intensity information (corrected light intensity information) which would be obtained if the velocity were 2.0 mm/s. While the correction here was made at one point of the IFG signal, it is also possible to perform correction at all points, without stipulating a target movable mirror range (Vo±B).

The corrected IFG signal generating unit 151e performs control to generate a corrected IFG signal by correcting the light intensity information obtained when the absolute value of movable mirror velocity Vc was outside the target movable mirror velocity range (Vo+B) into corrected light intensity information which would be obtained when the movable mirror velocity V of the movable mirror 262 is the target movable mirror velocity Vo, using the movable mirror velocity Vc and the correlation function.

Figure 5:
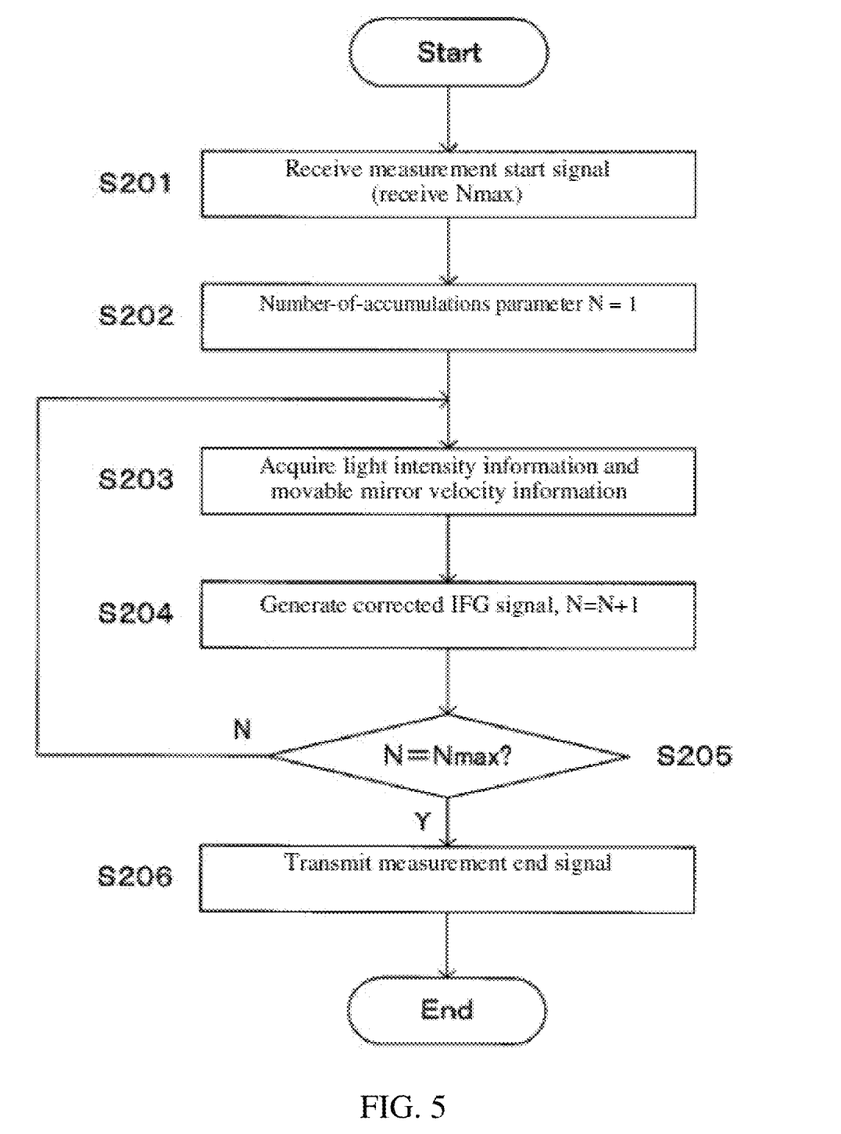
FIG. 5 A flow chart illustrating a method of acquiring IFG signal data.

The acquisition method for acquiring IFG signal data of corrected IFG signals for a number of accumulations Nmax will be described here. FIG. 5 is a flow chart intended to explain the method of acquiring IFG signal data.

First, in the processing of step S201, the measurer inputs a measurement start signal using input device 54. At this time, the measurer inputs the "number of accumulations Nmax" and "target movable mirror velocity Vo" and saves them in memory 52.

Next, in the processing of step S202, the number-of-accumulations parameter N is set to 1.

Next, in the processing of step S203, as the movable mirror control unit 151c moves the movable mirror 262, the light intensity information acquisition unit 151a acquires light intensity information, and the movable mirror velocity information acquisition unit 151b acquires movable mirror velocity information (movable mirror velocity Vc, etc.). The Nth IFG signal indicating the relationship between light intensity and movable mirror position is then generated (see FIG. 8).

Next, in the processing of step S204, light intensity information obtained when the absolute value of the movable mirror velocity Vc in the Nth IFG signal was outside the target movable mirror velocity range (Vo+B) is corrected to corrected light intensity information which would be obtained when the movable mirror velocity V of the movable mirror 262 is the target movable mirror velocity Vo, using the movable mirror speed Vc and correlation function. Namely, a corrected IFG signal is generated. Then N is made equal to N+1.

Next, in the processing of step S205, it is determined if N=Nmax. If it is determined that N is not equal to Nmax, the flow returns to the processing of step S203. Namely, the processing of step 203 through step S205 is repeated until the number of corrected IFG signals that will be used for computing the absorption spectrum of the sample S reaches Nmax.

Furthermore, if it is determined that N=Nmax, then in the processing of step S206, since Nmax [suitable] IFG signals have been acquired, a measurement end signal is outputted.

With FTIR 101, as described above, light intensity information obtained when the absolute value of the movable mirror velocity Vc of the movable mirror 262 is outside the target movable mirror velocity range (Vo+B) is corrected to corrected light intensity information which would be obtained when the movable mirror velocity V of the movable mirror 262 is the target movable mirror velocity Vo, using the movable mirror velocity Vc and a correlation function, thus making it possible to accurately compute the absorption spectrum of the sample S. Furthermore, since correction is performed, there is no data which is discarded and the process does not become prolonged.

Other Modes of Embodiment

The FTIR 101 described above was configured such that the light intensity information obtained when the absolute value of the movable mirror velocity Vc of the movable mirror 262 is outside the target movable mirror velocity range (Vo+B) is corrected to corrected light intensity information, but it is also possible to have a configuration whereby IFG signals which contain light intensity information obtained when the maximum value of the absolute value of the movable mirror velocity Vc of the movable mirror 262 was outside the target movable mirror velocity range (Vo+A) are not used for computing the absorption spectrum of the sample S. In other words, a configuration may be employed whereby the IFG signal is discarded if the velocity error is too great.

INDUSTRIAL APPLICABILITY

The present invention can be favorably used in Fourier transform infrared spectrophotometers and other interference spectrophotometers and the like.

EXPLANATION OF THE SYMBOLS

1 FTIR (interference spectrophotometer)
10 Infrared light source
20 Infrared light detection unit
30 Movable mirror velocity information detection unit
51 CPU (control unit)
52 Memory (storage unit)
70 Beam splitter
85 Stationary mirror
260 Movable mirror unit
262 Movable mirror

What is claimed is:

1. An interference spectrophotometer comprising:
    a movable mirror unit having a movable mirror capable of reciprocating movement;
    a stationary mirror;
    an infrared light source unit which emits an infrared light;
    a beam splitter which receives infrared light from said infrared light source unit, splits it into two toward said fixed mirror and movable mirror, receives the infrared light which is reflected back from said stationary mirror and the infrared light which is reflected back from the movable mirror, and combines them into interference light;
    an interference light detection unit in which a sample is placed and which detects light intensity information of interference light transmitted or reflected by said sample;
    a movable mirror velocity information detection unit which detects movable mirror velocity information for said movable mirror; and
    a control unit which acquires said light intensity information and movable mirror velocity information and computes the absorption or transmission spectrum of said sample;
    said interference spectrophotometer being further characterized in that it comprises a storage unit which stores a correlation function indicating change in light intensity information in relation to movable mirror velocity, and a target movable mirror velocity, and
    said control unit corrects the light intensity information obtained by said interference light detection unit into corrected light intensity information which would be obtained when the movable mirror velocity of said movable mirror is the target movable mirror velocity, using said movable mirror velocity information and correlation function.

2. The interference spectrophotometer as described in claim 1, characterized in that said movable mirror velocity information detection unit comprises a laser light source which emits a laser light, and a laser light detection unit which, after said laser light has been split in two by a beam splitter toward said stationary mirror and movable mirror, detects laser interference light from the laser light which is reflected back from said stationary mirror and the laser light which is reflected back from the movable mirror; and
    said control unit computes the movement direction of said movable mirror, the location of said movable mirror and the movable mirror velocity based on said laser interference light.

3. The interference spectrophotometer as described in claim 2, characterized in that said control unit generates an interference light signal indicating the relationship between said light intensity information and movable mirror position based on said light intensity information, the movement direction of said movable mirror, the position of said movable mirror and the movable mirror velocity, and accumulates said interference light signal as said movable mirror repeats its reciprocating movement.

4. The interference spectrophotometer as described in claim 2, characterized in that said control unit performs feedback control of the voltage provided to said movable mirror unit so as to adjust said movable mirror.

5. An interference spectrophotometer as described in claim 3, characterized in that said control unit performs feedback control of the voltage provided to said movable mirror unit so as to adjust said movable mirror.

6. An interference spectrophotometer as described in claim 1, further characterized in that it comprises a storage unit which stores a target movable mirror velocity range, and said control unit does not employ light intensity information obtained when the movable mirror velocity of said movable mirror was outside the target movable mirror velocity range for computing the absorption or transmission spectrum of said sample.

* * * * *